(12) United States Patent
Takasaki et al.

(10) Patent No.: US 7,837,011 B2
(45) Date of Patent: Nov. 23, 2010

(54) ELEVATOR CONTROLLER

(75) Inventors: Kazuhiko Takasaki, Tokyo (JP); Yukitaka Monden, Tokyo (JP)

(73) Assignee: Toshiba Elevator Kabushiki Kaisha, Tokyo (JP)

( * ) Notice: Subject to any disclaimer, the term of this patent is extended or adjusted under 35 U.S.C. 154(b) by 904 days.

(21) Appl. No.: 10/591,394

(22) PCT Filed: Mar. 17, 2005

(86) PCT No.: PCT/JP2005/005454
§ 371 (c)(1), (2), (4) Date: Dec. 29, 2006

(87) PCT Pub. No.: WO2005/090216
PCT Pub. Date: Sep. 29, 2005

(65) Prior Publication Data
US 2007/0137945 A1 Jun. 21, 2007

(30) Foreign Application Priority Data
Mar. 18, 2004 (JP) .............................. 2004-078382
Mar. 18, 2004 (JP) .............................. 2004-078383

(51) Int. Cl.
*B66B 1/28* (2006.01)
(52) U.S. Cl. .................... 187/296; 187/290; 187/293
(58) Field of Classification Search .............. 187/290, 187/296, 293
See application file for complete search history.

(56) References Cited

U.S. PATENT DOCUMENTS

| | | | | |
|---|---|---|---|---|
| 5,285,029 A | * | 2/1994 | Araki | 187/290 |
| 5,783,928 A | * | 7/1998 | Okamura | 320/122 |
| 6,539,739 B2 | * | 4/2003 | Goto et al. | 62/244 |
| 7,246,686 B2 | * | 7/2007 | Smith et al. | 187/290 |
| 2001/0017234 A1 | | 8/2001 | Suga et al. | |
| 2001/0017236 A1 | | 8/2001 | Tominaga et al. | |
| 2003/0089556 A1 | * | 5/2003 | Eilinger | 187/290 |
| 2004/0232863 A1 | * | 11/2004 | Takahashi et al. | 318/432 |

FOREIGN PATENT DOCUMENTS

| | | |
|---|---|---|
| EP | 0 607 645 A1 | 7/1994 |
| JP | 5-17078 A | 1/1993 |

(Continued)

*Primary Examiner*—Walter Benson
*Assistant Examiner*—Kawing Chan
(74) *Attorney, Agent, or Firm*—Foley & Lardner LLP

(57) ABSTRACT

In addition to the construction of a typical elevator control device in which power generated during regenerative operation is dissipated by a resistance chopper (18), an elevator control device is newly provided with: an electric double layer capacitor (21) connected in parallel with the DC capacitor (3) that smoothes the DC ripple of the rectifier circuit (2) that rectifies the AC power of the AC power source (1) and having an electrostatic capacitance that is considerably larger than this DC capacitor; a voltage detection circuit (22) that detects the terminal voltage of this electric double layer capacitor; and a drive control unit (5) that uses a voltage in the vicinity of the rated voltage of the electric double layer capacitor as the operating voltage of resistance chopper and, when the terminal voltage detected by a voltage detection circuit reaches the voltage in the vicinity of the rated voltage of the electric double layer capacitor, operates and controls the resistance chopper.

4 Claims, 19 Drawing Sheets

FOREIGN PATENT DOCUMENTS

| | | |
|---|---|---|
| JP | 10-236743 A | 9/1998 |
| JP | 11-217166 A | 8/1999 |
| JP | 2000-53338 A | 2/2000 |
| JP | 2001-240322 A | 9/2001 |
| JP | 2001-240323 A | 9/2001 |
| JP | 2002-338151 A | 11/2002 |
| JP | 2003-333893 A | 11/2003 |

\* cited by examiner ( PRIOR ART )

ELEVATOR CONTROLLER

TECHNICAL FIELD

The present invention relates to an elevator control device whereby the power generated during power regenerative operation of the elevator is effectively utilized.

BACKGROUND ART

Typically, an elevator control device comprises a control drive system that supplies a prescribed drive power as shown in FIG. 1 and a roped elevator that raises and lowers a passenger cage using the drive power supplied from this control drive system.

This control drive system comprises a commercial AC power source 1, a rectifier circuit 2 that converts the AC power of this commercial AC power source 1 to DC power, a DC capacitor 3 that smoothes the DC power converted by this rectifier circuit 2, an inverter 4 that converts the DC power smoothed by this DC capacitor 3 to AC power of a desired frequency and supplies this to a motor 11, and a drive control unit 5 that performs control such as to supply AC power of a frequency in accordance with the speed instruction from the inverter 4 in accordance with a prescribed speed instruction and the rotational speed of the motor 11, and performs control of a resistance chopper, to be described.

Furthermore, the roped elevator comprises a motor 11, a rope 13 wound around a winding drum 12 that is connected with the rotary shaft of this motor 11, a passenger cage 14 and a balancing weight 15 that are suspended at the respective ends of this rope 13.

With an elevator control device as described above, when the passenger cage 14 is raised in a condition in which it is fully loaded with passengers or lowered in a condition in which it is nearly empty, powered operation (power running or powering) is performed whereby power generated in the sequence commercial AC power source 1→rectifier circuit 2 →DC capacitor 3→inverter 4 is applied to the motor 11. Contrariwise, when the passenger cage 14 is lowered in a condition in which the passenger cage 14 is practically fully loaded with passengers or raised in a condition in which it is close to empty, regenerative operation is performed in which power generated by the motor 11 is returned in the sequence: inverter 4→DC capacitor 3. During such regenerative operation, the power that is returned to the inverter 4 from the motor 11 is blocked by the rectifier circuit 2, so the problem may arise that the voltage on the input side of the inverter is increased, damaging the elements that constitute the rectifier circuit 2 or inverter 4.

Accordingly, conventionally, due to the need to dissipate power matching the increase in voltage produced by regenerated power returning to the inverter from the motor 11 during regenerative operation, a construction was adopted wherein a resistance chopper 18 comprising a self-extinguishing element 16 and resistance 17 was connected across the DC output line of the rectifier circuit 2, so that, if the DC voltage across the DC output line exceeded the set voltage during regenerative operation, a control signal 19 turning the self-extinguishing element 16 on was delivered by the drive control unit 5, causing power matching the increase in voltage to be dissipated by the resistance 17. An example thereof is disclosed in Laid-open Japanese Patent Application No. (Tokkai H. 5-17078).

However, with an elevator control device constructed as described above, there is the problem that the power that is generated by the motor 11 during regenerative operation is dissipated by the resistance 17 as heat, so the power obtained by regenerative operation cannot be effectively utilized.

In view of the above, an object of the present invention is to provide an elevator control device that performs control such that the power produced by regenerative operation is reliably stored and can be effectively utilized during powered operation.

DISCLOSURE OF THE INVENTION (1) In order to achieve the above object, the present invention is constituted as follows.

Specifically, there is provided an elevator control device having a rectifier circuit that converts an AC voltage from an AC power source to a DC voltage;

a DC capacitor that smoothes ripples of the DC voltage;

an inverter that converts a smoothed DC voltage to an AC voltage of variable voltage and variable frequency;

a motor that is driven by the AC voltage that is output from the inverter to raise or lower a passenger cage;

a resistance chopper that is connected in parallel with the DC capacitor; and a drive control unit that controls the inverter or controlling the resistance chopper such that the AC voltage of variable voltage and variable frequency is output in accordance with a speed instruction, the elevator control device comprising:

an electric double layer capacitor that having an electrostatic capacitance that is substantially larger than that of the DC capacitor and that is connected in parallel with the DC capacitor, and capable of accumulating substantially all of a regenerated power from the motor; and a voltage detection unit that detects a terminal voltage of the electric double layer capacitor, wherein the drive control unit employs a voltage in a vicinity of a rated voltage of a electric double layer capacitor as a drive voltage of a resistance chopper and operates and controls the resistance chopper when a terminal voltage detected by the voltage detection unit reaches a voltage in a vicinity of the rated voltage of the electric double layer capacitor.

Thanks to the construction of the present invention as described above, in which an electrostatic capacitance is provided in parallel with the DC capacitor and that is considerably larger than that of this DC capacitor, an electric double layer capacitor capable of accumulating practically all of the regenerated power from the motor is provided and, as drive control means, voltage in the vicinity of the rated voltage of the electric double layer capacitor is employed as the operating voltage of the resistance chopper and, if the terminal voltage that is detected by the voltage detection means reaches the voltage in the vicinity of the rated voltage of the electric double layer capacitor, and, by performing control of the operation of the resistance chopper, most of the power generated by the motor can be stored on the electric double layer capacitor and, if a condition is produced in which the rated voltage of the electric double layer capacitor is exceeded, dissipation in the form of heat can be produced by controlling the resistance chopper, it is possible to protect the electric double layer capacitor from overcharging.

It should be noted that, if, in the above construction (1), a switch is connected in series with the electric double layer capacitor, it is possible to avoid incidents of electrical shock etc due to DC voltage accumulated on the electric double layer capacitor by isolating the electric double layer capacitor from the DC capacitor when ordinary operation is not being performed, such as for example in the case where operation is stopped.

(2) In an elevator control device according to the present invention, by further providing, in addition to the structure 1 of paragraph (1) above, an initial charging circuit connected in series with the electric double layer capacitor and connected in parallel with the switch and resistance, and drive control means that charges the electric double layer capacitor while restricting the current during current passage from this AC power source by means of a resistance when the switch is turned off on commencement of current passage from the AC power source and that connects the electric double layer capacitor in parallel with the DC capacitor when the switch is turned on after a required time after commencement of passage of current by this AC power source, it is possible to charge the electric double layer capacitor while restricting the current during passage of current from the AC power source by means of a resistance and to thereby protect the electric double layer capacitor from rush current.

In a further elevator control device according to the present invention, by further providing, in addition to the structure of paragraph (1) above, a current breaking circuit connected in series with the electric double layer capacitor and that breaks inflow of excess current produced by a short-circuit fault of the DC capacitor or inverter to the electric double layer capacitor, the electric double layer capacitor can be likewise protected from overcurrent produced by a short-circuit fault of the DC capacitor or inverter.

(3) In addition, in an elevator control device according to the present invention, by further incorporating, in addition to the structure of paragraph (1) above, two structures according to paragraph (2) above, the electric double layer capacitor can be protected from overcurrent produced by rush current on commencement of passage of current from the AC power source or produced by a short-circuit fault of the DC capacitor or inverter during ordinary operation, for example.

(4) In addition, according to the present invention, in a construction according to any of paragraph (1) above to (3) above, power can be reliably stored during regenerative operation with a small number of components and this stored energy can be effectively re-used during the next powered operation, by providing: an electric double layer capacitor arranged so as to be capable of being connected in parallel with the DC capacitor and having an electrostatic capacitance that is considerably larger than this DC capacitor and that is capable of accumulating practically all of the regenerated power from the motor and which, when the inverter is below a prescribed switching frequency, substitutes for the voltage smoothing function of this DC capacitor by deletion of the DC capacitor; voltage detection means that detects the terminal voltage of this electric double layer capacitor; and drive control means that operates and controls a resistance chopper when the terminal voltage that is detected by the voltage detection means reaches the vicinity of the rated voltage of the electric double layer capacitor, the voltage in the vicinity of the rated voltage of the electric double layer capacitor constituting the operating voltage of the resistance chopper.

(5) Furthermore, the present invention consists in an elevator control device comprising:

a charging/discharging circuit provided additionally to the typical layout of an elevator control device in which power generated during regenerative operation is dissipated by a resistance chopper and connected across the DC output line of the rectifier circuit;

an electric double layer capacitor connected on the output side of this charging/discharging circuit and that stores DC voltage generated in the DC capacitor during charging control;

capacitor voltage detection means that detects the voltage generated in the DC capacitor; and charging/discharging control means wherein a charging set voltage is set that is larger than the rectified voltage from the AC power source rectified by the rectifier circuit and lower than the resistance chopper operating voltage and a discharging set voltage is set that is lower than the rectified voltage and that performs charging control of the charging/discharging circuit such that, when the voltage generated in the DC capacitor detected by the capacitor voltage detection means exceeds the charging set voltage, the electric double layer capacitor is charged and that performs discharging control of the charging/discharging circuit such that, when the voltage generated in the DC capacitor exceeds the discharging set voltage, the electric double layer capacitor is discharged.

Thanks to the above layout of the present invention as described, when the voltage generated in the DC capacitor detected by the capacitor voltage detection means is larger than the predetermined voltage from the AC power source rectified by the rectifier circuit, and exceeds the charging set voltage, that is lower than the operating voltage of the resistance chopper, the power that is generated by the motor during regenerative operation of the elevator is reliably stored on the electric double layer capacitor, making it possible to re-use this power for raising and lowering the elevator by discharge from the electric double layer capacitor during powered operation.

It should be noted that a construction could be adopted wherein, in discharge control of the charging/discharging circuit by the charging/discharging control means, discharge control of the charging/discharging circuit is performed whereby the output current of the rectifier circuit or the current representing the sum of the output current of this rectifier circuit and the discharge current from the charging/discharging circuit is detected and this detection current and a pre-set discharge set current are compared and discharge is performed from the electric double layer capacitor in the case where the detection current exceeds the pre-set discharging set current.

(6) An elevator control device according to the present invention has a construction wherein terminal voltage detection means that detects the terminal voltage of the electric double layer capacitor is provided in addition to the construction of paragraph (5) above, and, in addition, as the charging/discharging control means at least a charging set voltage and a fully charged set voltage of the electric double layer capacitor are set, and, if the voltage generated in the DC capacitor detected by the capacitor voltage detection means exceeds the charging set voltage, charging control of the charging/discharging circuit is performed such that the electric double layer capacitor is charged and charging is discontinued if the terminal voltage of the electric double layer capacitor detected by the terminal voltage detection means during charging control reaches the fully charged set voltage.

Thanks to the construction of the present invention as above, charging control of the charging/discharging circuit is performed such that the electric double layer capacitor is charged if the voltage generated on the DC capacitor exceeds the charging set voltage and charging thereof is discontinued if the terminal voltage of the electric double layer capacitor detected by the terminal voltage detection means during charging control reaches the fully charged set voltage, so the terminal voltage of the electric double layer capacitor can be maintained at no more than the fully charged set voltage and so protection against overcharging of the electric double layer capacitor can be achieved, extending the life of the electric double layer capacitor and avoiding deterioration of its performance.

In the case of discharge control also, a voltage drop set voltage of the electric double layer capacitor is likewise set, so that discharge is discontinued if the terminal voltage of the electric double layer capacitor detected by the terminal voltage detection means during discharge control has reached the voltage drop set voltage, so the terminal voltage of the electric double layer capacitor can be maintained at above the voltage drop set voltage so making it possible to protect the electric double layer capacitor from over discharge; likewise, the life of the electric double layer capacitor can be extended and deterioration of its performance avoided.

(7) An elevator control device according to the present invention has a construction wherein charging/discharging current detection means that detects the charging/discharging current of the electric double layer capacitor is provided in addition to the construction of (5) or (6) above, and, in addition, as the charging/discharging control means at least a current instruction value in respect of the electric double layer capacitor is set, and wherein charging/discharging control is performed of the charging/discharging the circuit in order to perform charging/discharging of the electric double layer capacitor such that the charging/discharging current detected by the charging/discharging current detection means coincides with the pre-set current instruction value; in this way, charging/discharging can be produced using a current value such that greatest efficiency is achieved for the electric double layer capacitor and/or charging/discharging circuit. Also, an excessively large current exceeding the current instruction value cannot flow in the electric double layer capacitor, so this contributes to overcurrent protection of the electric double layer capacitor and charging/discharging circuit.

It should be noted that, instead of the current instruction value described above, it would also be possible to adopt a construction wherein a charging limiting value larger than the current instruction value and a discharging limiting value are set, so that, when charging/discharging current increases beyond the charging limiting value or discharging limiting value of the charging/discharging current, the charging/discharging circuit is controlled so as to limit the charging/discharging current. In this way, a contribution to overcurrent protection of the electric double layer capacitor and charging/discharging circuit can likewise be achieved.

(8) Further in addition to the constructions of (5), (6) or (7), an elevator control device according to the present invention may be provided with a fuse circuit connected in series with the electric double layer capacitor or in series with the charging/discharging circuit and that breaks short-circuit current discharged from the electric double layer capacitor in the event of a short-circuit fault of a structural element of the charging/discharging circuit, thereby making it possible to protect the electric double layer capacitor from excess short-circuit current.

BRIEF DESCRIPTION OF THE DRAWINGS

FIG. 6 is added to the layout of FIG. 2;

BEST MODE FOR PUTTING THE INVENTION INTO PRACTICE

Embodiments of the present invention are described below with reference to the drawings.

Figure 1:
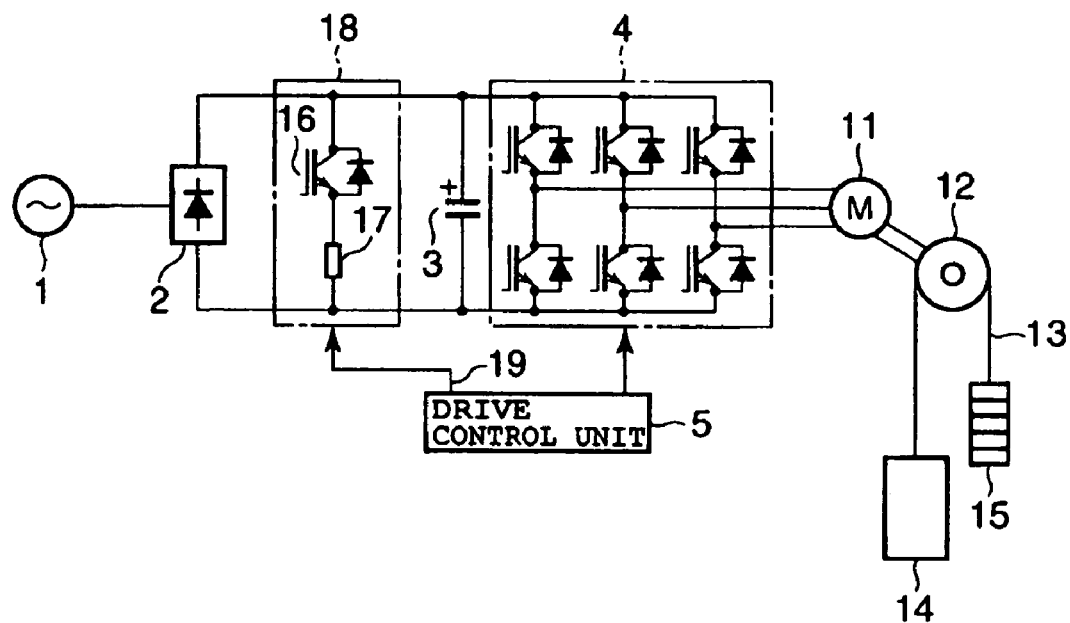
FIG. 1 is a layout diagram of a conventional elevator control device.
Figure 2:
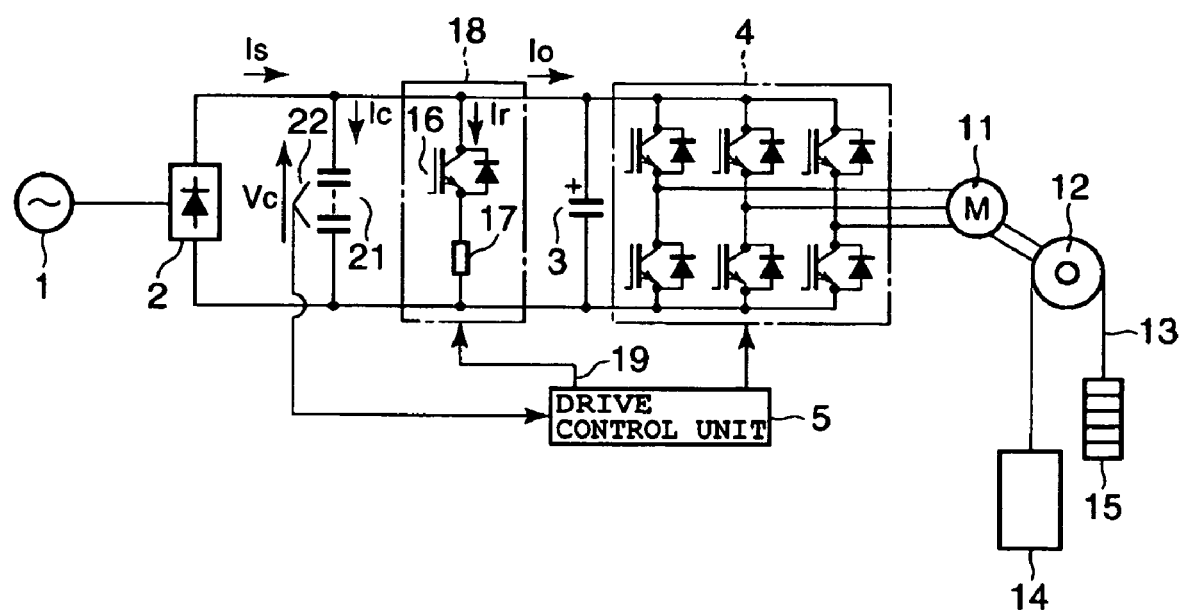
FIG. 2 is a layout diagram showing an embodiment of an elevator control device according to the present invention.

FIG. 2 is a layout diagram showing an embodiment of an elevator control device according to the present invention. In this Figure, parts that are the same as or equivalent to those of FIG. 1 are described by being given the same reference symbols.

This elevator control device comprises a drive control system that supplies required drive power in the same way as in FIG. 1 and a roped elevator that raises and lowers a passenger cage 14 using drive power from this drive control system.

This drive control system comprises a commercial AC power source 1, a rectifier circuit 2 that converts the AC power from this commercial AC power source 1 to DC power, a DC capacitor 3 that smoothes the DC power obtained by the conversion process performed by this rectifier circuit 2, an inverter 4 that supplies the DC power smoothed by this DC capacitor 3 to a motor 11 after conversion to AC power of the required frequency, a resistance chopper 18 that is connected in parallel with the DC capacitor 3 and that dissipates power as heat, an electric double layer capacitor 21 that is likewise connected in parallel with the DC capacitor 3, a voltage detection circuit 22 that detects the terminal voltage of this electric double layer capacitor 21 and a drive control unit 5 that controls the inverter 5 in accordance with a prescribed speed instruction and the speed of rotation of the motor 11, and that operates the resistance chopper 18 as required.

The electric double layer capacitor 21 referred to above is a device connected in parallel with the DC capacitor 3 as described above, having an electrostatic capacitance that is considerably larger than that of this DC capacitor 3 and having the function of storing electrical energy, that is capable of being charged and discharged with a large current in an extremely short time. Consequently, since the electrostatic capacitance of the electric double layer capacitor 21 is extremely large, it is capable of accumulating practically all of the regenerated power from the motor 11 and the DC voltage generated on the DC capacitor 3 is governed by the terminal voltage of the electric double layer capacitor 21.

The roped elevator described above comprises a motor 11, a rope 13 wound onto a winding drum 12 connected with the rotary shaft of this motor 11, a passenger cage 14 suspended at one end of this rope 13 and a balancing weight 15 suspended at the other end of the rope 13.

Figure 3:
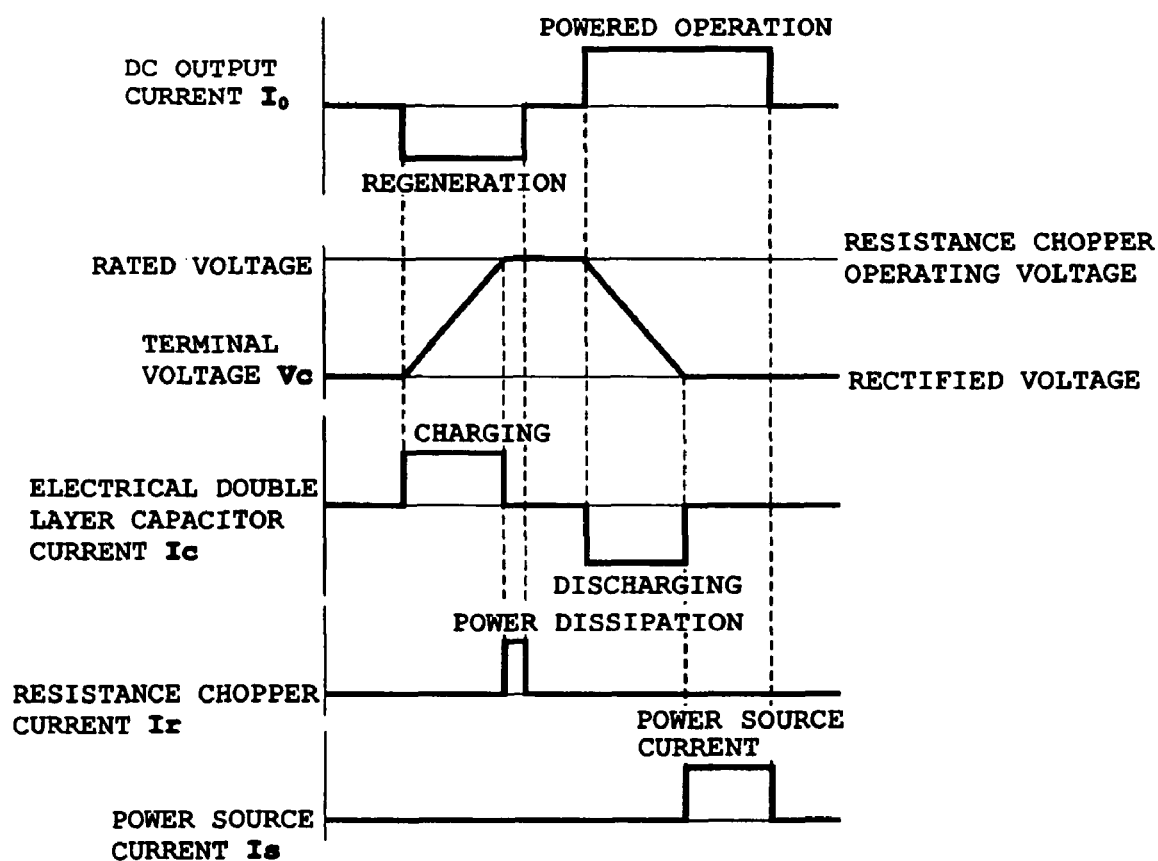
FIG. 3 is a timing chart given in explanation of charging/discharging control operation produced by a charging/discharging control circuit as shown in FIG. 2.

Next, the operation of the elevator control device as above will be described with reference to FIG. 3.

Since, typically, it is necessary to cause the passenger cage 14 to run with a prescribed speed when the passenger cage 14 is ascending in a condition close to full or when descending in a condition close to empty, powered operation is conducted in which power generated in the order: commercial AC power source 1→rectifier circuit 2→DC capacitor 3→inverter 4 is supplied to the motor 11. In contrast, regenerative operation is performed when the passenger cage 14 is descending in a condition close to full or is ascending in a condition close to empty, since the passenger cage 14 is in a condition in which it can run by itself, so power generated in the order: motor 11→inverter 4 is applied to the DC capacitor 4.

However, when power regenerated by the motor 11 is generated during regenerative operation, current 10 flows: motor 11→inverter 4→rectifier circuit 2 to the DC output line, but since this current is blocked by the rectifier circuit 2 so that it cannot flow into the commercial AC power source 1, the current Ic flows into the electric double layer capacitor 21 i.e. the regenerated power is accumulated in the electric double layer capacitor 21, raising the terminal voltage Vc. The terminal voltage of the electric double layer capacitor 21 is then detected by the voltage detection circuit 22 and delivered to the drive control unit 5.

In this drive control unit 5, a voltage corresponding to the rated voltage of the electric double layer capacitor 21 is set beforehand as the operating voltage of the resistance chopper 18 and the terminal voltage of the electric double layer capacitor 21 detected by the voltage detection circuit 22 is compared with the operating voltage of the resistance chopper 18; when the electric double layer capacitor 21 has been charged up to the rated voltage, the drive control unit 5 performs control to turn the self-extinguishing element 16 constituting the resistance chopper 18 on. As a result, the electric double layer capacitor 21 is protected from overcharging since, due to the voltage exceeding the rated voltage of the electric double layer capacitor 21, a resistance chopper current Ir flows in the resistance chopper 18 and power is dissipated as heat.

It should be noted that, when the electric double layer capacitor 21 is accumulating regenerated power, the terminal voltage of the electric double layer capacitor 21 is larger than the rectified voltage produced by the rectifier circuit 2 of the AC power source 1, so the current Is from the AC power source 1 is blocked by this rectifier circuit 2 and so cannot flow to the electric double layer capacitor 21.

Consequently, during subsequent powered operation of the motor 11, all of the power of the powered operation of this motor 11 is supplied from the electric double layer capacitor 21 until the terminal voltage of this electric double layer capacitor 21 is gradually decreased by discharge of the electric double layer capacitor 21.

When all of the regenerated power accumulated in the electric double layer capacitor 21 has been discharged, the terminal voltage of the electric double layer capacitor 21 becomes lower than the rectified voltage of the AC power source 1 and discharge operation is thereby discontinued. With this discontinuance of the discharge operation, a current Is flows: commercial AC power source 1→rectifier circuit 2→DC output line and supply of power to the motor 11 from the commercial AC power source 1 is thereby continued without a break.

Consequently, with an embodiment as described above, by connecting an electric double layer capacitor 21 of large electrostatic capacitance across the DC output line of the rectifier circuit 2 i.e. in parallel with the DC capacitor 3, practically all of the regenerated energy generated by the motor 11 can be stored on the electric double layer capacitor 21 and can be re-used by discharging this stored energy when the next powered operation of the motor 11 takes place.

Also, due to the provision of the resistance chopper 18 and electric double layer capacitor 21, with the operating voltage of the resistance chopper 18 set to the rated voltage of the electric double layer capacitor 21, the electric double layer capacitor 21 can be protected from overcharging since the resistance chopper 18 is automatically operated when the terminal voltage of the electric double layer capacitor 21 reaches the rated voltage.

Figure 4:
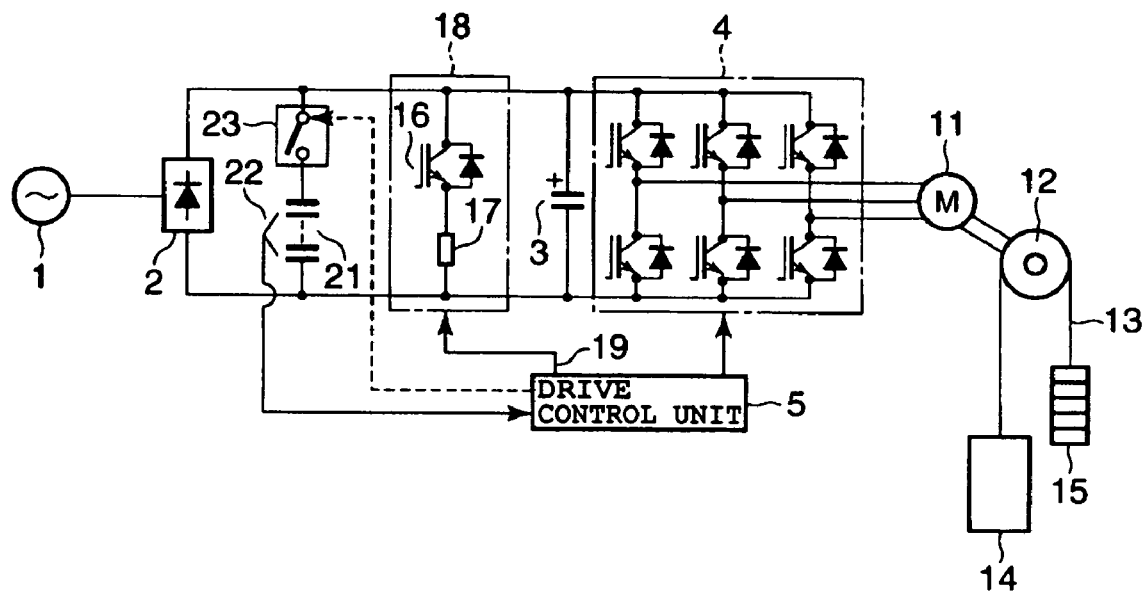
FIG. 4 is a layout diagram showing a further embodiment of an elevator control device according to the present invention.

FIG. 4 is a layout diagram showing a further embodiment of an elevator control device according to the present invention. In this Figure, parts which are the same or equivalent to those of FIG. 2 are given the same reference numerals and for further detailed description thereof the reader is referred to FIG. 2.

In this embodiment, in addition to the construction shown in FIG. 2, a switch 23 is connected in series with the electric double layer capacitor 21. If this switch 23 were not provided, the electric double layer capacitor 21 would be constantly connected in parallel with the DC capacitor 3 and a condition would be produced in which DC voltage was thereby constantly applied.

Accordingly, as the switch 23 is connected with the electric double layer capacitor 21, the drive control unit 5 performs on control of the switch 23 during normal operation, but, when the elevator cage is stopped, performs off control of the switch 23, when the electric double layer capacitor 21 is not used.

Consequently, with this embodiment, by performing off control of the switch 23 when the electric double layer capacitor 21 is not used, when the elevator cage is stopped, the electric double layer capacitor 21 can be electrically isolated from the DC voltage of the DC capacitor 3, thereby making it possible to prevent occurrence of incidents of electric shock etc caused by the DC voltage accumulated on the electric double layer capacitor 21.

Figure 5:
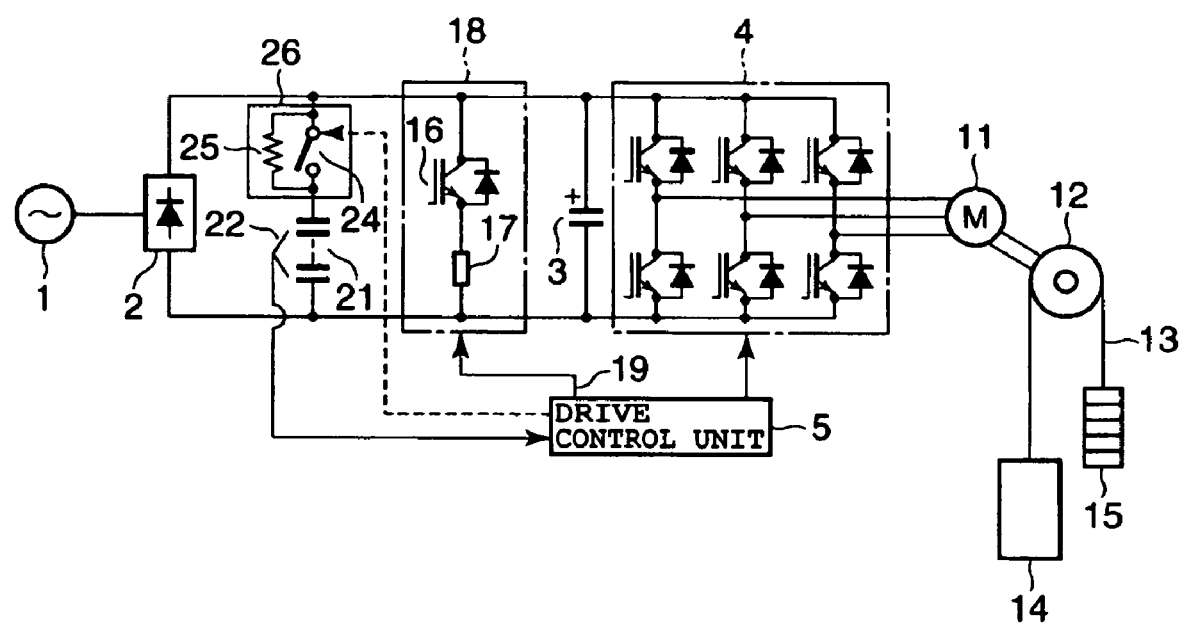
FIG. 5 is a layout diagram showing yet a further embodiment of an elevator control device according to the present invention.

FIG. 5 is a layout diagram showing yet a further embodiment of an elevator control device according to the present invention. In this Figure, parts which are the same or equivalent to those of FIG. 2 are given the same reference numerals and for further detailed description thereof the reader is referred to FIG. 2.

In this embodiment, in addition to the construction shown in FIG. 2, an initial charging circuit 26, comprising a switch 24 and resistance 25 connected in parallel, is connected in series with the electric double layer capacitor 21. Specifically, the drive control unit 5 of this device delivers an off control signal when current is passed from the commercial AC power source 1, putting the switch 24 of the initial charging circuit 26 into the off condition and connecting the electric double layer capacitor 21 with the commercial AC power source 1 through the resistance 25. As a result, DC power rectified by passage through the rectifier circuit 2 is supplied from the commercial AC power source 1 and gradually charges the electric double layer capacitor 21 with a current restricted by the resistance 25. After the lapse of a predetermined prescribed time after commencement of passage of current by the commercial AC power source 1, the drive control unit 5 delivers an on signal, turning the switch 24 on, and connecting the electric double layer capacitor 21 in parallel with the DC capacitor 3.

With this embodiment, on commencement of passage of current by the commercial AC power source 1, the electric double layer capacitor 21 is gradually charged up by the DC power from the commercial AC power source 1 rectified by the rectifier circuit 2 with a current restricted by the resistance 25, so flow of rush current into the electric double layer capacitor 21 from the commercial AC power source 1 when the capacitor 21 is not fully charged can be avoided, thereby protecting the electric double layer capacitor 21 from rush current, making it possible to extend the life of the electric double layer capacitor 21 and preventing deterioration of its performance.

Figure 6:
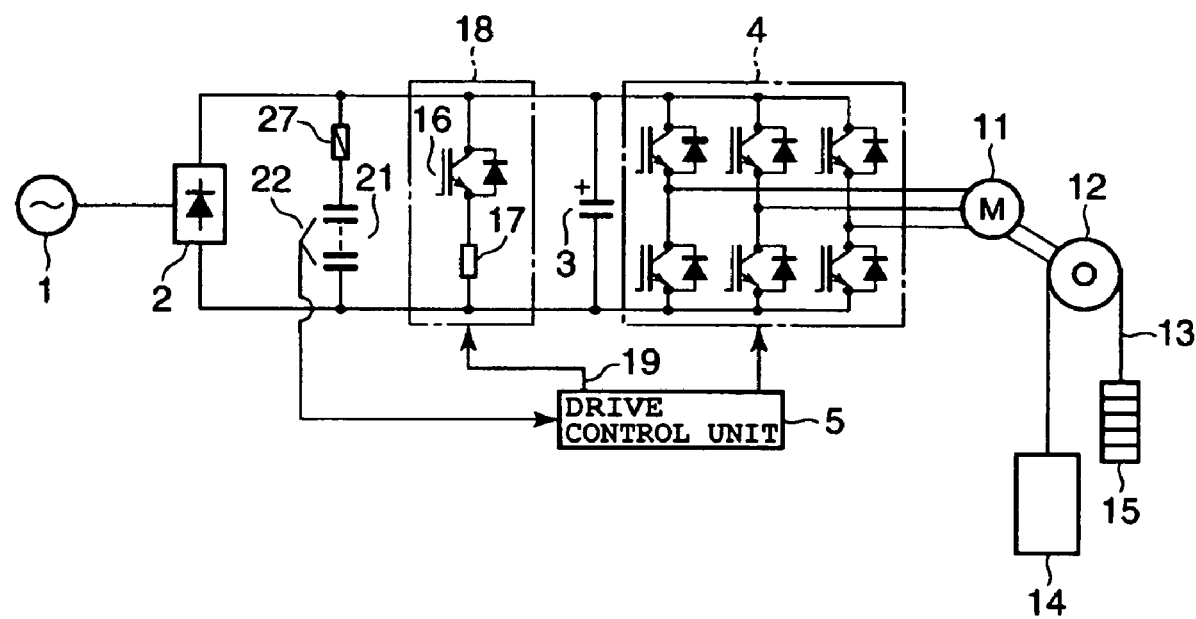
FIG. 6 is a layout diagram showing yet a further embodiment of an elevator control device according to the present invention.

FIG. 6 is a layout diagram showing yet a further embodiment of an elevator control device according to the present invention. In this Figure, parts which are the same or equivalent to those of FIG. 2 are given the same reference numerals and for further detailed description thereof the reader is referred to FIG. 2.

In this embodiment, in addition to the construction shown in FIG. 2, a current breaker circuit 27 such as for example a fuse is connected in series with the electric double layer capacitor 21. This current breaker circuit 27 prevents inflow of current to the electric double layer capacitor 21 by breaking the current by for example melting, if the current of the electric double layer capacitor 21 becomes excessive.

Consequently, with this embodiment, if a short-circuit fault occurs in the DC capacitor 3 or inverter 4, the short-circuiting current flowing into the electric double layer capacitor 21 is broken, making it possible to prevent consequential damage, such as failure of the electric double layer capacitor 21, in the case of a short-circuit fault.

Figure 7:
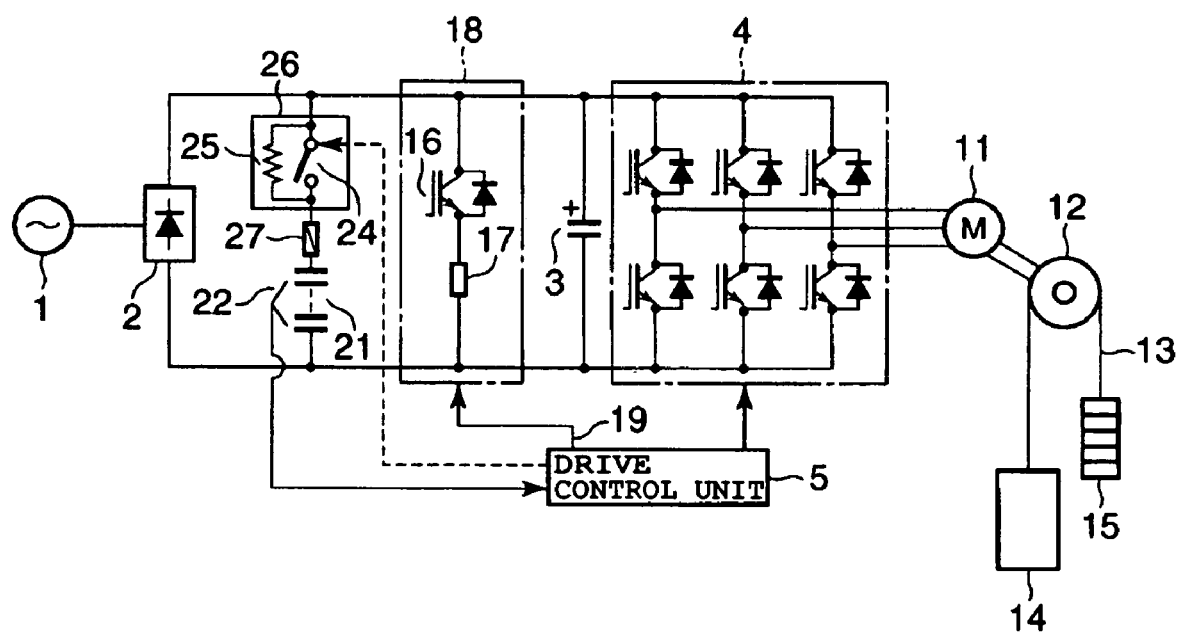
FIG. 7 is a layout diagram in which the construction of FIG. 5

FIG. 7 is a diagram given in explanation of yet a further modified example of an elevator control device according to the present invention. More specifically, it is a layout diagram of a combination of FIG. 5 and FIG. 6.

This embodiment is a construction in which an initial charging circuit 26 and a current breaker circuit 27 that breaks in flowing overcurrent is connected in series with the electric double layer capacitor 21. As a result, on commencement of passage of current from the commercial AC power source 1, DC power rectified by passage through the rectifier circuit 2 is supplied from the commercial AC power source 1 and gradually charges the electric double layer capacitor 21 with a current restricted by the resistance 25. After the lapse of a predetermined prescribed time after commencement of passage of current by the commercial AC power source 1, the switch 24 is turned on, connecting the electric double layer capacitor 21 in parallel with the DC capacitor 3.

When the electric double layer capacitor 21 is connected in parallel with this DC capacitor 3, if a short-circuit fault occurs in the DC capacitor 3 or inverter 4, this short-circuit current tries to flow into the electric double layer capacitor 21, but when this overcurrent is detected, the short-circuit current is broken and inflow of short-circuit current into the electric double layer capacitor 21 can thereby be prevented.

Consequently, with the embodiment described above, the electric double layer capacitor 21 is protected from rush current on commencement of passage of current by the commercial AC power source 1 or short-circuit current produced by short-circuit faults of the DC capacitor or inverter during normal operation; furthermore, power regenerated by the motor 11 can be reliably stored on the electric double layer capacitor 21 and can be re-used by discharging this stored energy on the next occasion of powered operation.

Figure 8:
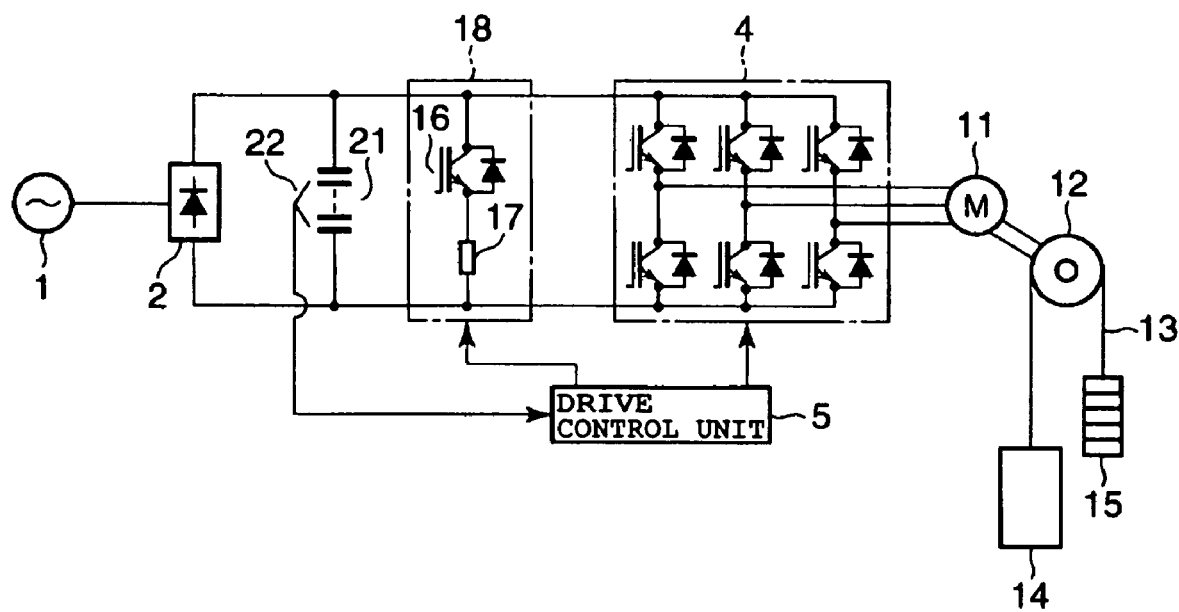
FIG. 8 is a layout diagram showing yet a further embodiment of an elevator control device according to the present invention.

FIG. 8 is a layout diagram showing yet a further embodiment of an elevator control device according to the present invention.

This embodiment is a construction in which in for example the construction of FIG. 2, the DC capacitor 3 that is connected across the DC output lines of the rectifier circuit 2 is deleted and the function of this DC capacitor 3 is given to the electric double layer capacitor 21.

This electric double layer capacitor 21 is fully capable of coping with high-speed charging/discharging operation, so so long as the switching frequency of the inverter 4 is not more than a few kHz, it can substitute for the voltage smoothing function that would otherwise be performed by the DC capacitor 3 and as a result the DC capacitor 3 can be deleted.

Accordingly, with such a construction, the number of components can be reduced by deleting the DC capacitor 3.

In this embodiment, the presence of a transformer or distribution line (or wiring) impedance between the commercial AC power source 1 and rectifier circuit 2 is envisioned and the impedance thereof is represented in the Figure as L.

In this elevator control device, there are provided a drive control system that supplies the required drive power and a roped elevator that raises and lowers the passenger cage using the drive power from this drive control system in the same way as in FIG. 1; in addition, a charging/discharging control system is provided.

This drive control system comprises a commercial AC power source 1, impedance L of the distribution line (wiring) or transformer, a rectifier circuit 2 that converts the AC power from the commercial AC power source 1 to DC power, a DC capacitor 3 that smoothes the DC power obtained by conversion performed by the rectifier circuit 2, an inverter 4 that converts the DC power smoothed by this DC capacitor 3 to AC power of the required frequency and that supplies this power to the motor 11, and a drive control unit 5 that controls the inverter 4 in accordance with prescribed speed instructions and the rotational speed of the motor 11, so as to output AC power of frequency in accordance with the speed instructions.

The charging/discharging control system described above comprises a charging/discharging circuit 20 comprising charging/discharging control elements 28, 28 such as a plurality of self-extinguishing elements connected in parallel across the DC output line of the rectifier circuit 2, a DC reactor 29 connected with the common connection point of the plurality of charging/discharging control elements 28, 28 and having the function of smoothing the DC power rectified by the rectifier circuit 2, an electric double layer capacitor 21, a voltage detection circuit 22 and a charging/discharging control unit 30.

The electric double layer capacitor 21 referred to above is a device connected across the DC output line of the rectifier circuit 2 through the charging/discharging circuit 20 and in parallel with the DC capacitor 3, having an electrostatic capacitance of for example 1000 to 10,000 times the capacity of the DC capacitor 3 and having the function of storing electrical energy, that is capable of being charged and discharged with a large current in an extremely short time.

The voltage detection circuit 22 described above detects the DC link voltage generated in the DC capacitor 3, which is the voltage across the DC output line of the rectifier circuit 2 and delivers this detected voltage to the charging/discharging control unit 30. This charging/discharging control unit 30 has a set charging voltage and set discharging voltage and compares the DC link voltage generated in the DC capacitor 3 detected by the voltage detection circuit 22 with the aforementioned set voltages and has the function of charging or discharging control of the charging/discharging circuit 20 when the DC link voltage goes beyond the limits defined by these set voltages.

Figure 10:
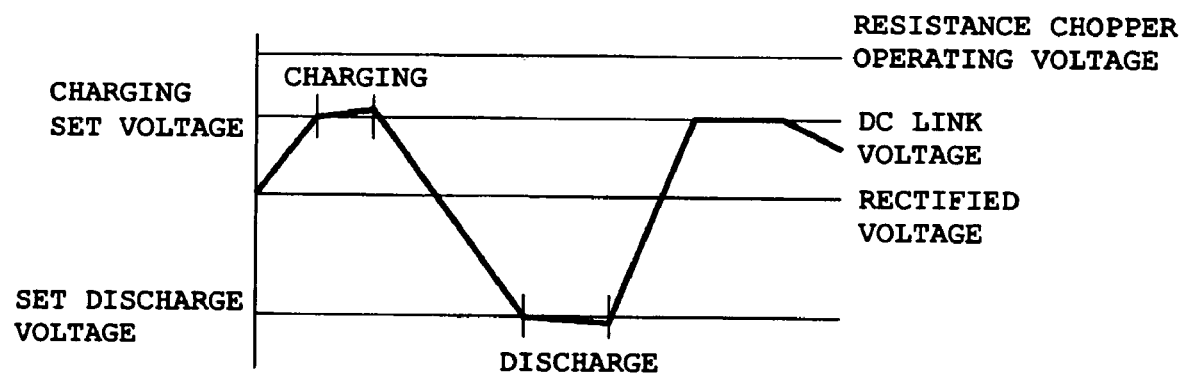
FIG. 10 is a voltage waveform diagram given in explanation of the charging/discharging control operation of the charging/discharging control circuit shown in FIG. 9.

Incidentally, as shown in FIG. 10, the set charging voltage referred to above is a voltage larger than the rectified voltage produced by the rectifier circuit 2 of the commercial AC power source 1 and lower than the operating voltage of the resistance chopper 18 and the set discharge voltage is a voltage lower than the rectified voltage produced by the rectifier circuit 2 of the commercial AC power source 1.

In a device according to the present invention, normally, the DC link voltage generated in the DC capacitor 3 is detected by the voltage detection circuit 22 and delivered to the charging/discharging control unit 30. As shown in FIG. 10, the charging/discharging control unit 30 compares the DC link voltage detected by the voltage detection circuit 22 with the set charging voltage, that is larger than the rectified voltage produced by the rectifier circuit 2 and that is lower than the operating voltage of the resistance chopper 18 and executes charging control in respect of the charging/discharging control elements 28 constituting the charging/discharging circuit 20 when the DC link voltage exceeds the set charging voltage, so that the link voltage generated by the DC capacitor 3 charges the electric double layer capacitor 21.

Also, the charging/discharging control unit 30, when the DC link voltage is lower than the set discharge voltage, which is lower than the rectified voltage produced by the rectifier circuit 2, i.e. during powered operation, executes charging control in respect of the charging/discharging control elements 28 constituting the charging/discharging circuit 20, so that the power accumulated in the electric double layer capacitor 21 is discharged across the DC output line of the rectifier circuit 2 i.e. is discharged to the DC capacitor 3.

Consequently, although in the above embodiment the voltage at the inverter input terminal is increased by the power generated by the motor 11 during regenerative operation, this increased condition is detected from the DC link voltage generated in the DC capacitor 3. If this detected DC link voltage is higher than the rectified voltage produced by the rectifier circuit 2 and exceeds the set charging voltage, which is lower than the operating voltage of the resistance chopper 18, reliable charging of the electric double layer capacitor 21 can be performed and, during powered operation, if the DC link voltage is lower than the set discharge voltage, which is lower than the rectified voltage, the power of the electric double layer capacitor 21 is discharged, making possible re-use of power.

Two additional constructional examples regarding the control of commencement of charging/discharging will now be described.

Figure 11:
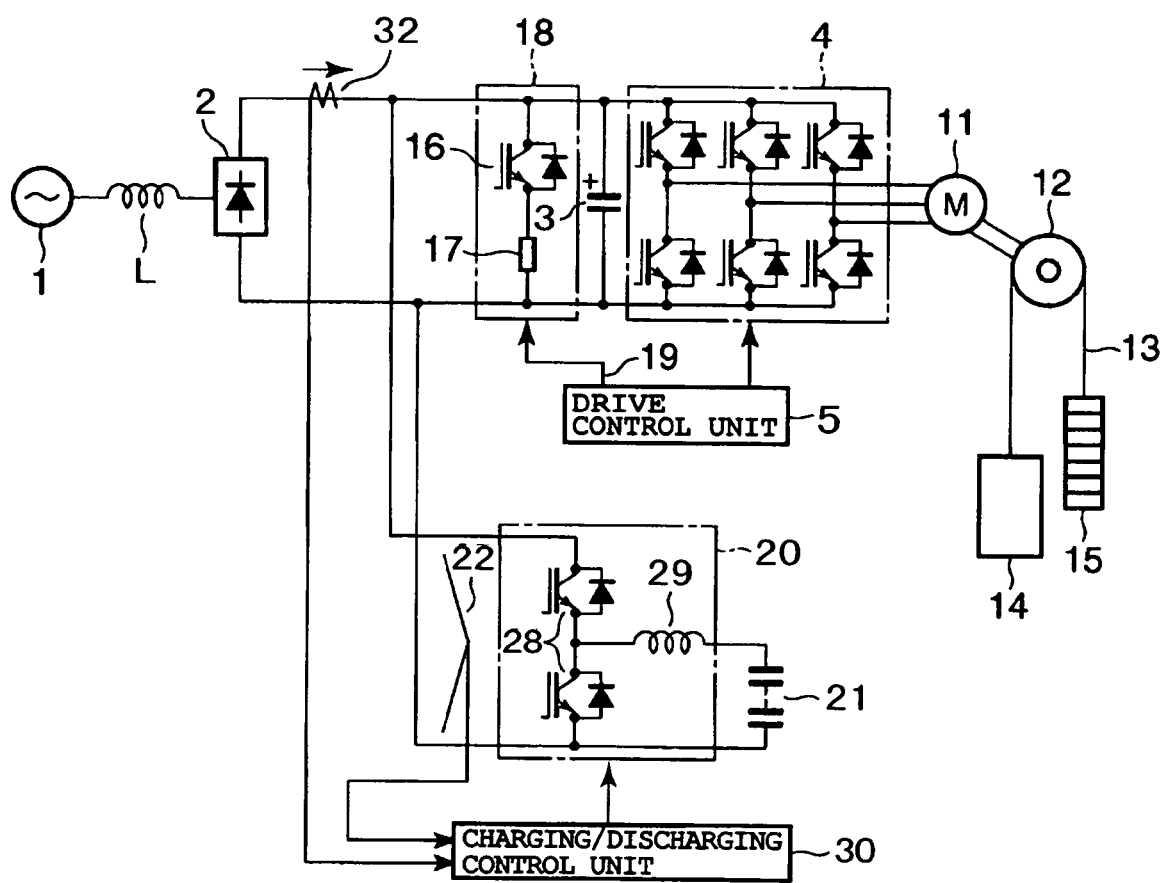
FIG. 11 is a layout diagram showing yet a further embodiment of an elevator control device according to the present invention.

FIG. 11 is a layout diagram of an elevator control device according to the present invention, describing an example relating to control of commencement of charging/discharging.

Figure 9:
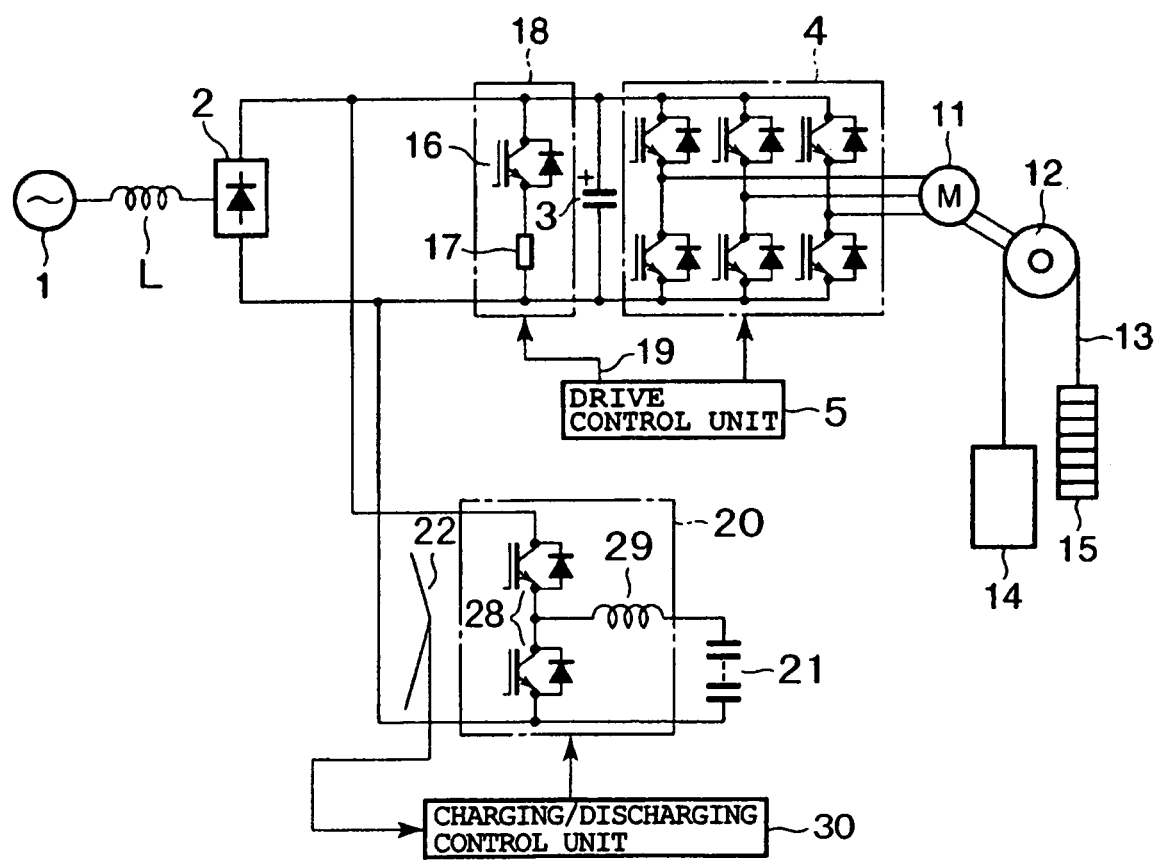
FIG. 9 is a layout diagram showing an embodiment of an elevator control device according to the present invention.

In the embodiment shown in FIG. 9, an example was described in which charging/discharging control of the charging/discharging circuit 20 was performed by the charging/discharging control unit 30 in accordance with the detected DC link voltage detected by the voltage detection circuit 22, which detects the DC link voltage generated in the DC capacitor 3, and a set voltage. However, in the case of the elevator control device shown in FIG. 11, in addition to the voltage detection circuit 22, there is provided a current detection circuit 32 that detects the output current of the rectifier circuit 2; in this example charging/discharging control of the charging/discharging circuit 20 is performed using the DC link voltage and the rectifier circuit output current respectively detected by the voltage detection circuit 22 and the current detection circuit 32.

To describe a concrete example, the voltage detection circuit 22 detects the DC link voltage generated in the DC capacitor 3 and delivers this to the charging/discharging control unit 30. Also, the current detection circuit 32 detects the output current of the rectifier circuit 2 and likewise delivers this to the charging/discharging control unit 30.

Figure 12A:
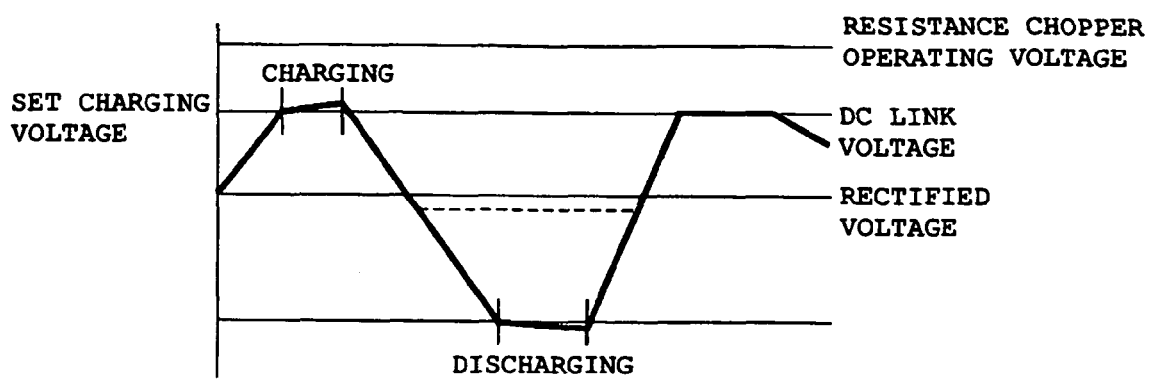
FIG. 12A and 12B are voltage and current waveform diagram is given in explanation of the charging/discharging commencement control performed by the charging/discharging control circuit shown in FIG. 11.

As shown in FIG. 12A, this charging/discharging control unit 30 compares the DC link voltage generated on the DC capacitor 3 detected by the voltage detection circuit 22 with the set charging voltage, which is larger than the rectified voltage of the commercial AC power source 1 and lower than the operating voltage of the resistance chopper 18, and controls the charging/discharging circuit 30 such that the DC link voltage charges the electric double layer capacitor 21 if the DC link voltage exceeds the set charging voltage.

Figure 12B:
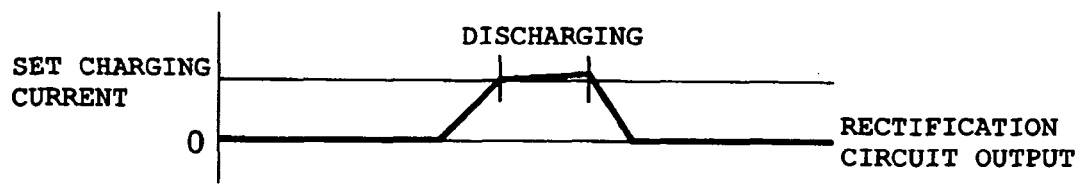

Furthermore, in the case of a discharge control, as shown in FIG. 12B, the charging/discharging control unit 30 compares the rectifier circuit output current detected by the current detection circuit 32 with the pre-set discharge current and controls the charging/discharging circuit 30 such as to discharge the voltage of the electric double layer capacitor 21 if the rectifier circuit output current exceeds the set discharge current.

With this construction, even in the case where the impedance of the distribution line (wiring) and/or transformer is small, so that there is practically no drop in the DC link voltage as shown by the dotted line in FIG. 12A in powered operation of the motor 11, power is discharged from the electric double layer capacitor 21 and can be effectively re-used by arranging to detect the rectifier circuit output current and to compare this with the set discharge current and arranging to commence discharge control of the charging/discharging circuit 20 from the charging/discharging control unit 30 accordingly.

Figure 13:
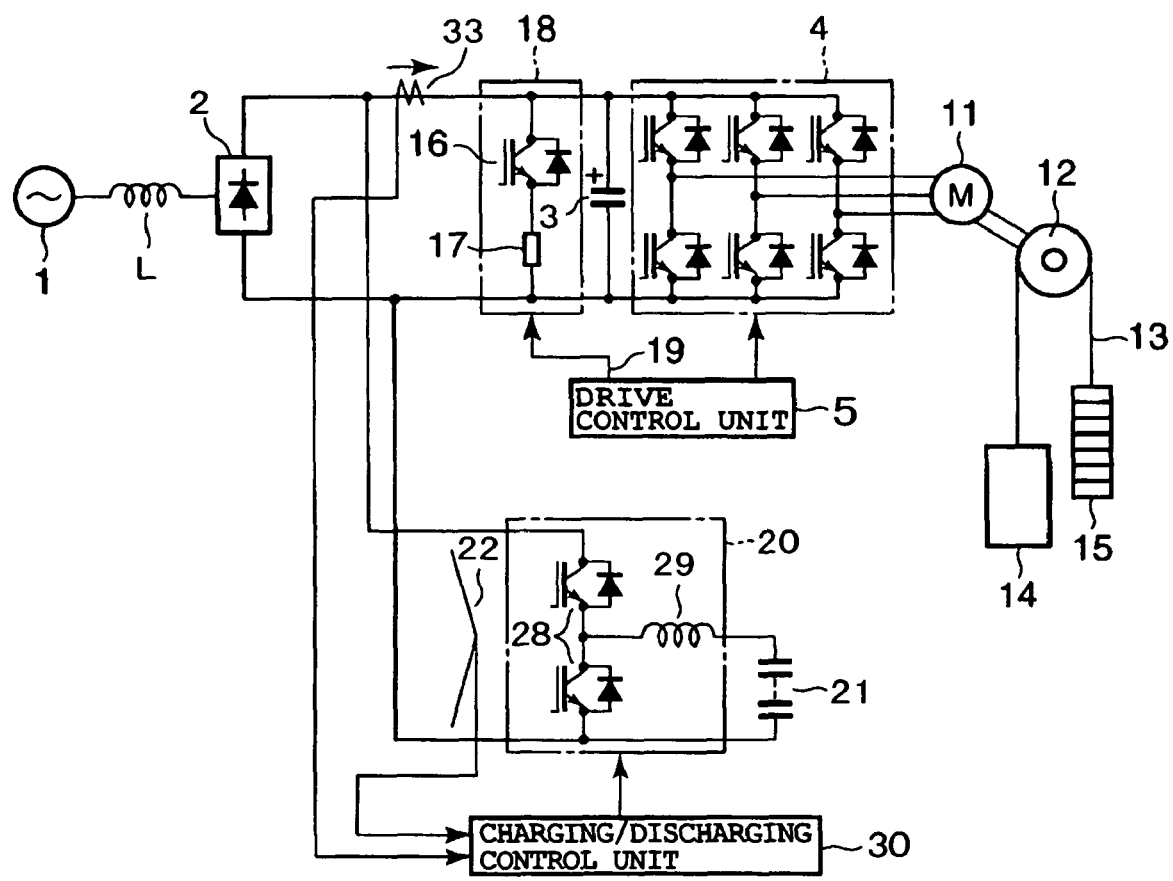
FIG. 13 is a layout diagram showing yet a further embodiment of an elevator control device according to the present invention.

FIG. 13 is a layout diagram of an elevator control device according to the present invention given in explanation of a further example relating to control of commencement of charging and discharging.

Figure 14A:
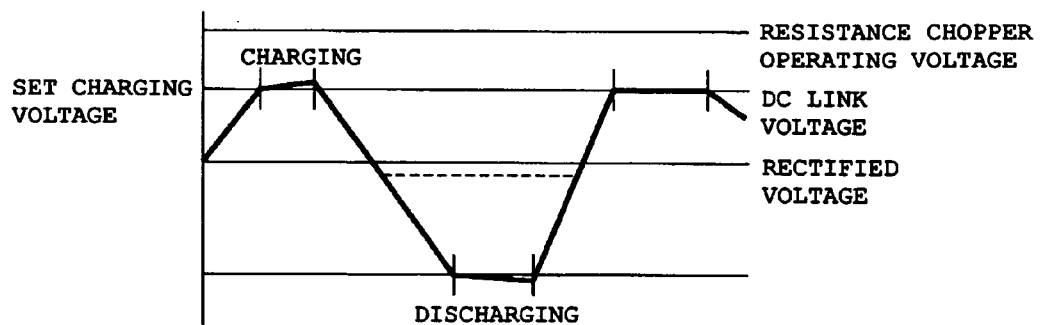
FIG. 14A and 14B are voltage and current waveform diagrams given in explanation of the charging/discharging commencement control performed by the charging/discharging control circuit shown in FIG. 13.
Figure 14B:
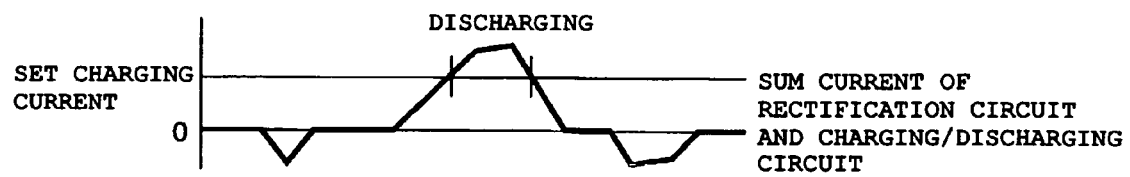

As shown in FIG. 13, this elevator control device comprises a current detection circuit 33 that detects the sum of the output current of the rectifier circuit 2 and the discharge current from the charging/discharging circuit 20 and delivers this current sum detected by this current detection circuit 33 to the charging/discharging control unit 30. As shown in FIG. 14A, in regard to charging control, this charging/discharging control unit 30 makes a decision in accordance with the DC link voltage generated in the DC capacitor 3 detected by the voltage detection circuit 22, but, in regard to discharging control, as shown in FIG. 14B, compares the current sum with a pre-set discharge voltage and controls the charging/discharging circuit 30 so as to discharge the power accumulated on the electric double layer capacitor 21 if the current sum exceeds the set discharge voltage.

Consequently, with this embodiment, even if the impedance of the distribution line (wiring) and/or transformer is small, so that there is scarcely any drop in the DC link voltage in powered operation of the motor 11, as shown by the dotted line in FIG. 14A, by detecting the rectifier circuit output current and comparing this with the set discharge current, the charging/discharging control unit 30 is able to perform discharge control of the charging/discharging circuit 20, so that the power discharge from the electric double layer capacitor 21 can be effectively re-used.

Figure 15:
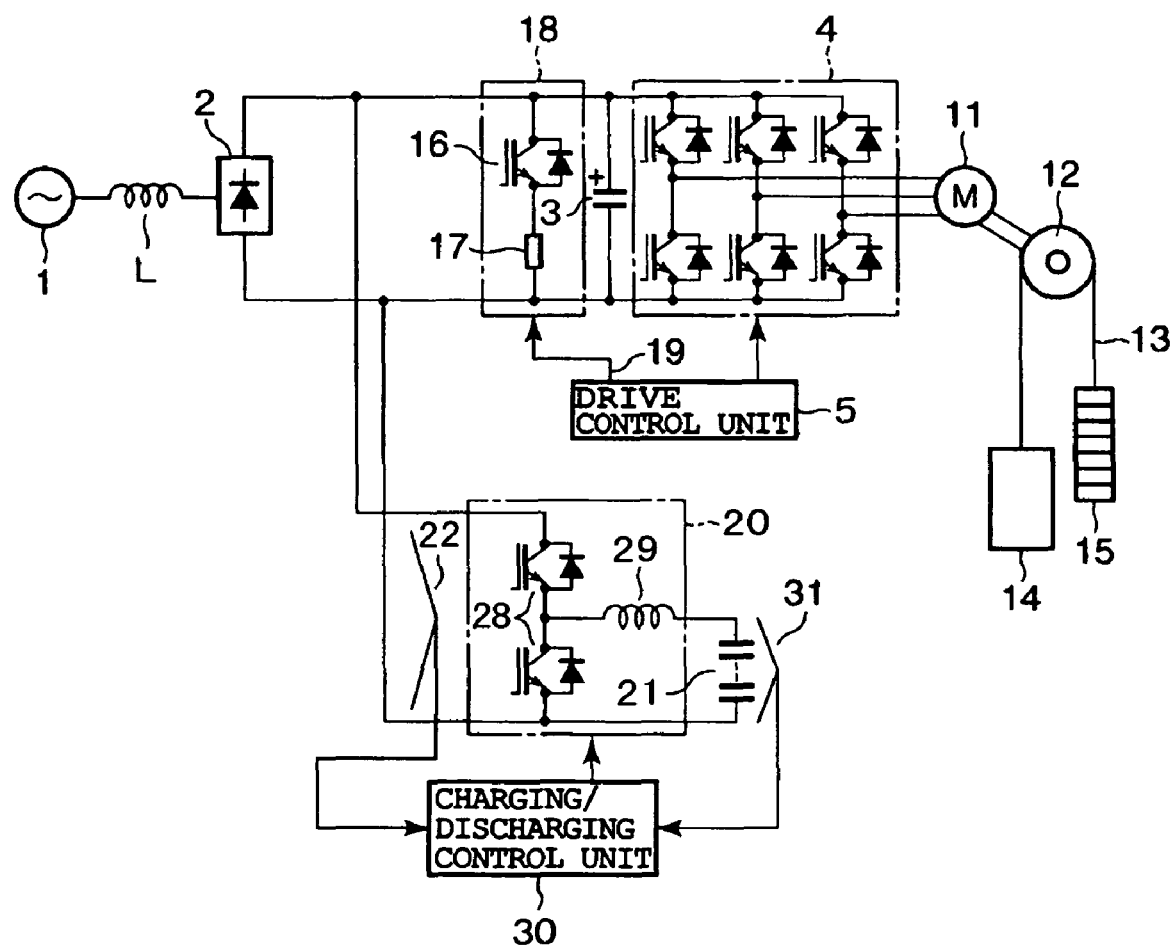
FIG. 15 is a layout diagram showing a further embodiment of an elevator control device according to the present invention.

FIG. 15 is a layout diagram showing a further embodiment of an elevator control device according to the present invention. In this Figure, parts that are the same as or equivalent to parts in FIG. 9 are given the same reference symbols and the reader is referred to FIG. 9 for detailed description thereof.

In this elevator control device, in addition to the construction shown in FIG. 9, a voltage detection circuit 31 that detects the terminal voltage of the electric double layer capacitor 21 is added. Specifically, there are provided a first voltage detection circuit 22 that detects the DC link voltage generated in the DC capacitor 3 and a second voltage detection circuit 31 that detects the terminal voltage of the electric double layer capacitor 21. Since the charging/discharging control unit 30 can detect the terminal voltage of the electric double layer capacitor 21, there is no possibility of overcharging of the electric double layer capacitor 21 and control is thus achieved whereby charging is efficiently performed.

Figure 16:
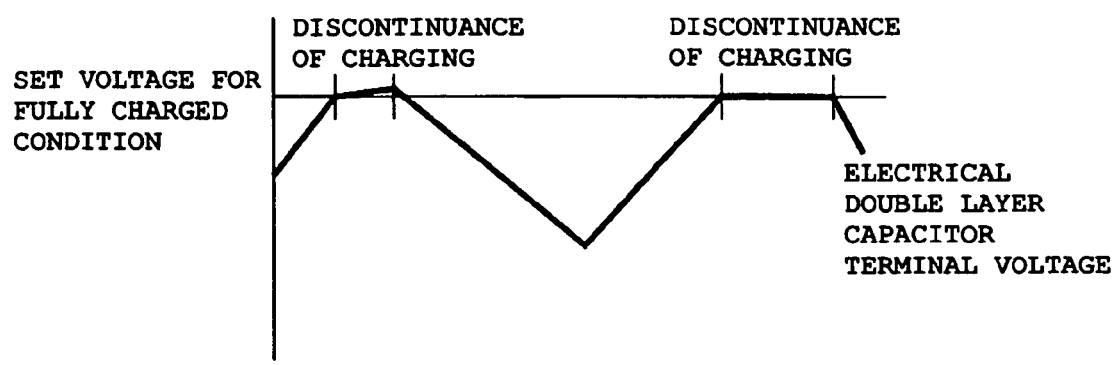
FIG. 16 is a voltage waveform diagram given in explanation of discontinuance of charging produced by the charging/discharging control circuit shown in FIG. 15.
Figure 17:
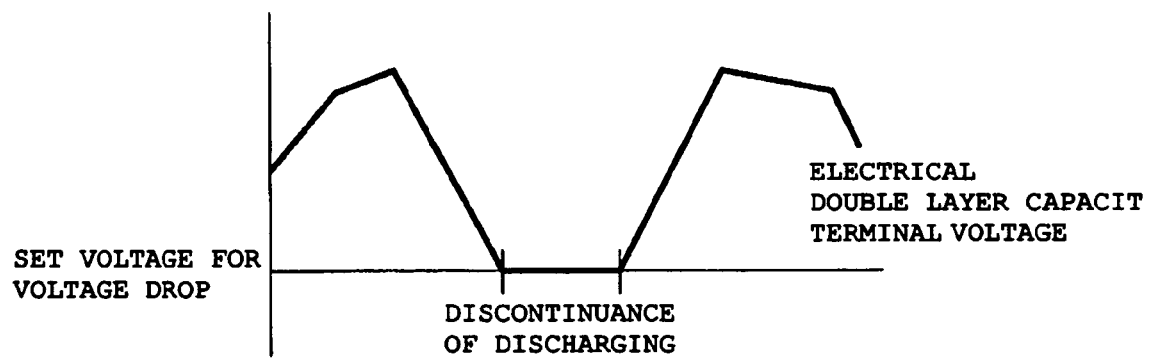
FIG. 17 is a voltage waveform diagram given in explanation of the discontinuance of discharging produced by the charging/discharging control circuit shown in FIG. 15.

In this charging/discharging control unit 30, a set charging voltage and set discharge voltage are set in the same way as in the case of FIG. 10 and charging control and discharging control are performed based on the DC link voltage generated on the DC capacitor 3 and on this set charging voltage and set discharging voltage. Also, the charging/discharging control unit 30 sets the set voltage (see FIG. 16) representing the fully charged condition, i.e. at which there is no overcharging, of the electric double layer capacitor 21 and the set voltage (see FIG. 17) in the case of a fall of the terminal voltage of the electric double layer capacitor 21 and, during control of charging (see FIG. 10) based on the DC link voltage generated in the DC capacitor 3, executes discontinuation of charging if the set voltage representing the fully charged condition of the terminal voltage of the electric double layer capacitor 21 is exceeded; and executes discontinuation of discharging if the terminal voltage of the electric double layer capacitor 21 during discharge control (see FIG. 10) based on the DC link voltage generated on the DC capacitor 3 falls below the set voltage for voltage drop.

Next, the operation of the elevator control device as above will be described.

First of all, the charging/discharging control unit 30 is constantly in receipt of the DC link voltage generated by the DC capacitor 3 from the first voltage detection circuit 22 and if this DC link voltage exceeds the charging set voltage, which is larger than the rectifier voltage produced by the rectifier circuit 2 and lower than the operating voltage of the resistance chopper 18, the charging/discharging control unit 30 executes charging control of the charging/discharge control elements 28 that constitute the charging/discharging circuit 20, producing charging of the electric double layer capacitor 21 with the DC link voltage generated on the DC capacitor 3. However, if, during regenerative operation, charging of the electric double layer capacitor 21 were to be performed unilaterally, overcharging would be produced, with a result that the life of the electric double layer capacitor 21 would be shortened.

Accordingly, during charging control, the charging/discharging control unit 30 is in receipt of the terminal voltage of the electric double layer capacitor 21 from the second voltage detection circuit 31 and so, if the terminal voltage of this electric double layer capacitor 21 exceeds the set fully charged voltage thereof, the charging/discharging control unit 30 performs control action such that charging operation of the electric double layer capacitor 21 is discontinued.

On the other hand, since the charging/discharging control unit 30 is in receipt of the DC link voltage generated on the DC capacitor 3 from the first voltage detection circuit 22 and is in receipt of the terminal voltage of the electric double layer capacitor 21 from the second voltage detection circuit 31 during discharge control, if the terminal voltage of this electric double layer capacitor 21 is lower than the set voltage for voltage drop, the charging/discharging control unit 30 performs control such as to discontinue the operation of discharge from the electric double layer capacitor 21.

Consequently, with this embodiment, apart from the same benefits as are obtained with FIG. 2, the terminal voltage of the electric double layer capacitor 21 can be maintained below the set voltage representing the fully charged condition and so the electric double layer capacitor 21 can be protected from overcharging, thereby making it possible to extend the life of the electric double layer capacitor 21 and prevent deterioration of its performance.

Also, the terminal voltage of the electric double layer capacitor 21 can be maintained above the set voltage for voltage drop, making it possible to protect the electric double layer capacitor 21 from over-discharging, likewise enabling the life of the electric double layer capacitor 21 to be extended and preventing deterioration of its performance.

In addition, the lower limit of usable voltage of the electric double layer capacitor 21 is determined, so the output current value in the electric double layer capacitor 21 can be calculated, making it possible to optimize the design of the control device in regard to maximum current.

It should be noted that, although, in this embodiment, discontinuance of charging operation in response to a fully charged condition during charging control and discontinuance of discharging operation in response to the set voltage of voltage drop during discharge control were implemented, it would be possible to adopt a construction implementing only discontinuance of charging operation in response to a fully charged condition during charging control or to adopt a construction implementing only discontinuance of discharging operation in response to the set voltage of voltage drop during discharge control.

Figure 18:
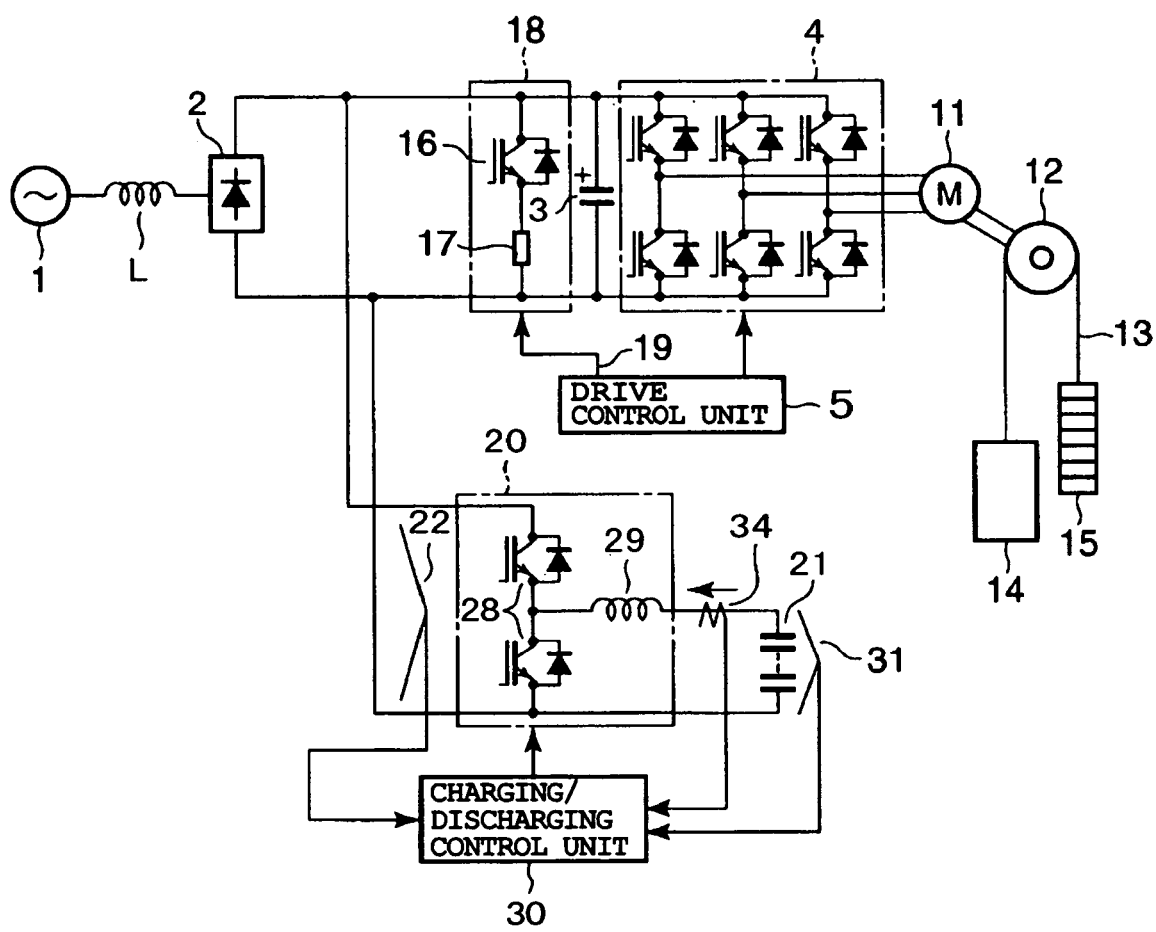
FIG. 18 is a layout diagram showing yet a further embodiment of an elevator control device according to the present invention.

FIG. 18 is a layout diagram showing yet a further embodiment of an elevator control device according to the present invention.

In this embodiment, in addition to the construction of FIG. 15 including the construction FIG. 9, a current detection circuit 34 that detects the charging current of the electric double layer capacitor 21 is provided.

This current detection circuit 34 detects the charging/discharging current of the electric double layer capacitor 21 and delivers this detected charging/discharging current to the charging/discharging control unit 30. In this charging/discharging control unit 30, in addition to the set voltages referred to above (see FIG. 10, FIG. 16 and FIG. 17), a current instruction value is set and the charging/discharging circuit 20 is controlled such that a charging current flows such as to coincide with the current instruction value in respect of the electric double layer capacitor 21.

Next, the operation of the elevator control device as above will be described.

The charging/discharging control unit 30 is constantly in receipt of the DC link voltage generated on the DC capacitor 3 from the first voltage detection circuit 22 and, if this DC link voltage exceeds the set charging voltage, which is higher than the rectified voltage obtained from the rectifier circuit 2 and lower than the operating voltage of the resistance chopper 18, the charging/discharging control circuit 30 executes charging control in respect of the charging/discharging control elements 28 constituting the charging/discharging circuit 20, such that the DC link voltage generated on the DC capacitor 3 charges the electric double layer capacitor 21.

During charging control, the charging/discharging control unit 30 is in receipt of the charging current detected by the current detection circuit 34 and compares this charging current with a pre-set current instruction value and controls the charging/discharging circuit 20 such that this charging current coincides with the current instruction value.

In addition, this charging/discharging control unit 30 controls the charging current during charging control and is in receipt of the terminal voltage of the electric double layer capacitor 21 from the second voltage detection circuit 31 and discontinues charging if this terminal voltage exceeds the set voltage representing the fully charged condition.

Also during powered operation, this charging/discharging control unit 30 controls the charging/discharging circuit 20 in accordance with the voltage and discharge current detected by the first and second voltage detection circuits 22, 31 and current detection circuit 34 in the same way as described above. In particular, the charging/discharging control unit 30 is in receipt of the discharge current detected by the current detection circuit 34 and controls the charging/discharging circuit 20 by comparing this discharge current with a pre-set current instruction value such that the discharge current coincides with the current instruction value.

Consequently, according to the embodiment described above, the charging/discharging control unit 30 performs charging/discharging control in accordance with the charging/discharging current detected by the current detection circuit 34 such that the charging/discharging current of the electric double layer capacitor 21 is the current instruction value, so that charging/discharging is effected using a current value which is most efficient with respect to the electric double layer capacitor 21 and the charging/discharging circuit 20. Also, since it is not possible for excess current exceeding the current instruction value to flow in the electric double layer capacitor 21, a contribution to overcurrent protection of the electric double layer capacitor 21 and/or charging/discharging circuit 20 can be achieved.

It should be noted that, although in this embodiment, an example was described in which first and second voltage detection circuits 22 and 31 were provided, a construction would also be possible in which for example only the first voltage detection circuit 22 is provided.

Further, yet another modified example of an elevator control device according to the present invention is described with reference to FIG. 18.

In the embodiment of FIG. 18 described above, it was arranged for the charging/discharging control unit 30 to compare the charging/discharging current detected by the current detection circuit 34 with a pre-set current instruction value, but, in this embodiment, the construction is such that a charging limiting value and discharging limiting value are set beforehand in respect of the charging/discharging current that are larger than the current instruction value and the charging/discharging control unit 30 compares the charging current of the electric double layer capacitor 21 detected by the current detection circuit 34 with the charging limiting value and, if the charging current tries to increase such that the charging current exceeds the charging limiting value, this charging/discharging circuit 20 is controlled so as to restrict this charging current. Also, the discharge current of the electric double layer capacitor 21 detected by the current detection circuit 34 and the discharge limiting value are compared and if the discharge current tries to increase such that the discharge current exceeds the discharge limiting value, the charging/discharging circuit 20 is controlled such as to restrict this discharge current. That is, control is effected such as to widen the gate ignition angle (firing angle) of the charging/discharging control elements 28 constituting the charging/discharging circuit 20.

Consequently, according to this embodiment, by restricting the charging/discharging current of the electric double layer capacitor 21 to the current value of the charging limiting value or discharging limiting value, a contribution to overcurrent protection of the electric double layer capacitor 21 and/or charging/discharging circuit 20 can be achieved.

Figure 19:
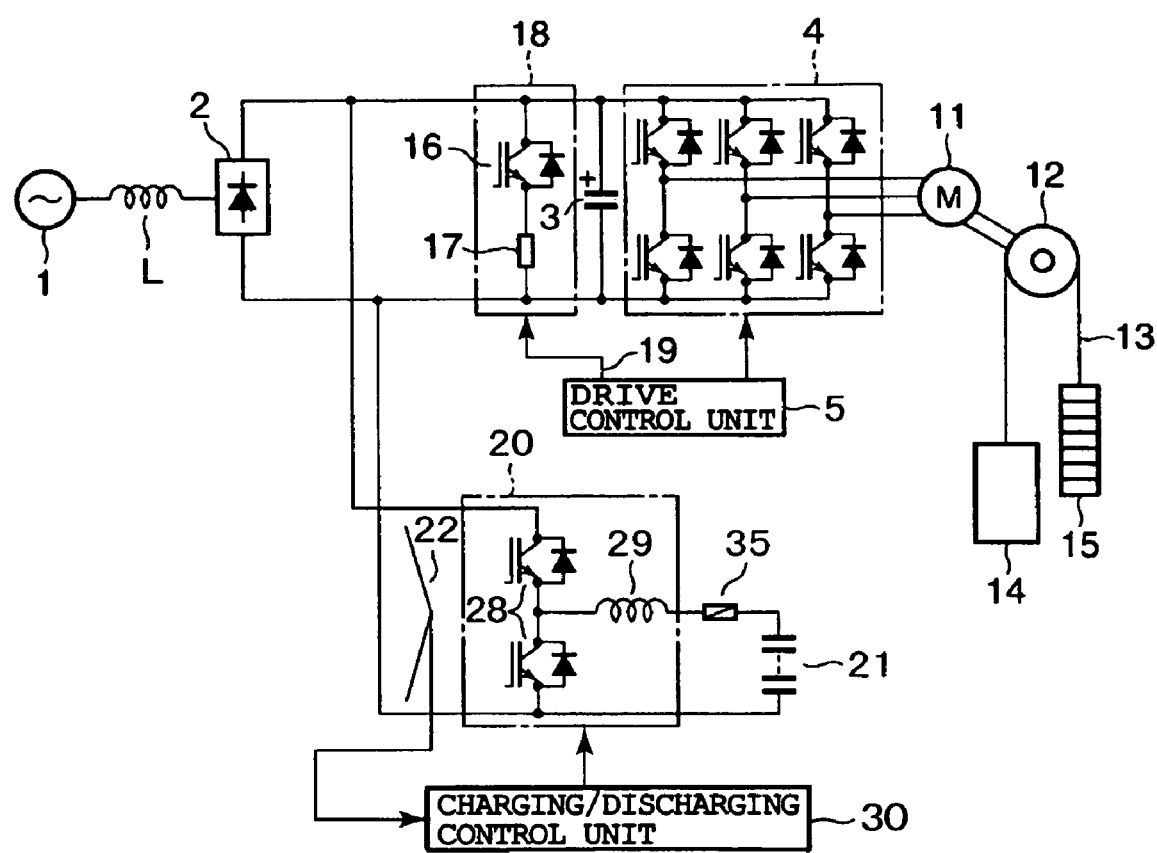
FIG. 19 is a layout diagram showing yet a further embodiment of an elevator control device according to the present invention.

FIG. 19 is a layout diagram showing yet a further embodiment of an elevator control device according to the present invention. Parts in this Figure which are the same as or equivalent to parts in FIG. 9 are given the same reference symbols and for further detailed description thereof the reader is referred to FIG. 9.

This embodiment is a construction in which a fuse 35 is interposed between the DC reactor 29 and the electric double layer capacitor 21 of the construction shown in FIG. 9. Specifically, in addition to the construction shown in FIG. 9, a fuse 35 is connected in series with the electric double layer capacitor 21.

The reason for providing such a fuse 35 is in order to protect the electric double layer capacitor 21 from excessive short-circuit current by breaking a short-circuit current discharged from the electric double layer capacitor 21 in the event that a short-circuit fault occurs in either one or both of the charging/discharging control elements 28 constituting the charging/discharging circuit 20.

It should be noted that although, in this embodiment, a construction was adopted in which a fuse 35 was connected with the layout shown in FIG. 9, it would be possible for example to adopt a construction in which a fuse 35 was connected to the layout shown in FIG. 15 or FIG. 18.

Figure 20:
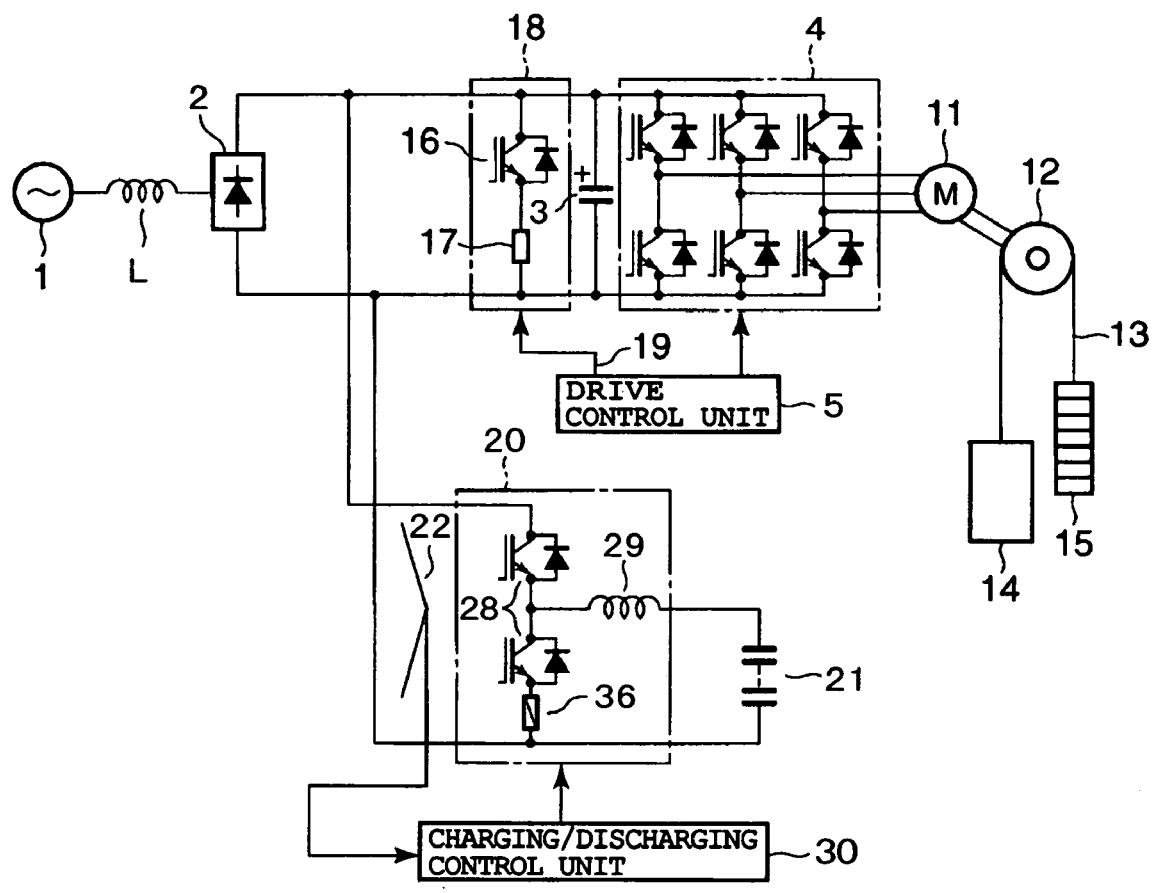
FIG. 20 is a layout diagram showing yet a further embodiment of an elevator control device according to the present invention.

FIG. 20 is a layout diagram showing yet a further embodiment of an elevator control device according to the present invention. In this Figure, parts which are the same as or equivalent to parts in FIG. 9 are given the same reference symbols and for detailed description thereof the reader is referred to FIG. 9.

In this embodiment, a fuse 36 is connected in series with the charging/discharging control of elements 28 constituting the charging/discharging circuit 20 shown in FIG. 9.

The reason for providing such a fuse 36 is in order to protect the electric double layer capacitor 21 from excessive short-circuit current by breaking a short-circuit current discharged from the electric double layer capacitor 21 in the event that a short-circuit fault occurs in either one or both of the charging/discharging control elements 28 constituting the charging/discharging circuit 20. Also, the device as a whole is protected from overcurrent by breaking short-circuit current flowing into the charging/discharging circuit 20 from the DC voltage generated on the output line of the rectifier circuit 20 or the DC capacitor 3.

It should be noted that although, in this embodiment, a construction was adopted in which a fuse 36 was connected with the layout shown in FIG. 9, it would be possible for example to adopt a construction in which a fuse 36 was connected to the layout shown in FIG. 15 or FIG. 18.

Apart from this, the present invention is not restricted to the embodiments described above and could be implemented modified in various ways without departing from the scope of its gist.

Also, the various embodiments could be implemented in combination as far as possible and in this case benefits are obtained by the combination. Furthermore, the above embodiments include various more general and more particular inventions, so various inventions could be extracted by suitably combining a plurality of disclosed structural elements. For example, if an invention is extracted by dispensing with some structural features from the totality of structural features set out in the means for solving the problem, the portions dispensed with when implementing such an extracted invention may be suitably supplemented by technical general knowledge.

INDUSTRIAL APPLICABILITY

The present invention provides an elevator control device that makes possible reliable storage of power obtained by regenerative operation so that this can be effectively re-used during powered operation.

What is claimed is:

1. An elevator control device comprising:
a rectifier circuit that converts an AC voltage from an AC power source to a DC voltage;
a DC capacitor that smoothes ripples of said DC voltage;
an inverter that converts a smoothed DC voltage to an AC voltage of variable voltage and variable frequency;
a motor that is driven by said AC voltage that is output from said inverter to raise or lower a passenger cage;
a resistance chopper that is connected in parallel with said DC capacitor; and
a drive control unit that controls said inverter or controlling said resistance chopper such that said AC voltage of variable voltage and variable frequency is output in accordance with a speed instruction;
an electric double layer capacitor having an electrostatic capacitance that is substantially larger than that of said DC capacitor and that is connected in parallel with said DC capacitor, and capable of accumulating substantially all of a regenerated power from said motor;
a voltage detection unit that detects a terminal voltage of said electric double layer capacitor, and
an initial charging circuit connected in series with said electric double layer capacitor, and said initial charging circuit including a switch and a resistance connected in parallel to each other,
said drive control unit employing a voltage in a vicinity of a rated voltage of a electric double layer capacitor as a drive voltage of a resistance chopper and operates and controls said resistance chopper when a terminal voltage detected by said voltage detection unit reaches a voltage in a vicinity of said rated voltage of said electric double layer capacitor, and
said drive control unit charging said electric double layer capacitor while restricting a current during current passage from said AC power source due to said resistance when said switch is turned off on commencement of current passage from said AC power source and that connects said electric double layer capacitor in parallel with said DC capacitor when said switch is turned on after a required time after commencement of passage of current by said AC power source.

2. The elevator control device according to claim 1, further comprising:
a switch connected in series with said electric double layer capacitor, that is turned on in response to an operating instruction from said drive control unit during normal operation and that isolates said electric double layer capacitor from said DC capacitor when operation is stopped.

3. The elevator control device according to claim 1, further comprising:
a current breaking circuit connected in series with said electric double layer capacitor and that breaks an inflow of excess current produced by a short-circuit fault of said DC capacitor or said inverter to said electric double layer capacitor.

4. The elevator control device according to claim 1, in which, when said inverter is below a prescribed switching frequency, said electric double layer capacitor substitutes for a voltage smoothing function of said DC capacitor by deletion of said DC capacitor; and
when said terminal voltage that is detected by said voltage detection unit reaches the vicinity of said rated voltage of said electric double layer capacitor, a voltage in the vicinity of said rated voltage of said electric double layer capacitor constitutes said operating voltage of said resistance chopper.

* * * * *